United States Patent [19]

Ono et al.

[11] Patent Number: 5,794,040
[45] Date of Patent: Aug. 11, 1998

[54] PROGRAM CREATION APPARATUS FOR REACTIVE SYSTEMS

[75] Inventors: Kiyoshi Ono; Seiki Yaegashi, both of Yokohama, Japan

[73] Assignee: International Business Machines Corporation, Armonk, N.Y.

[21] Appl. No.: 557,756

[22] Filed: Nov. 10, 1995

[30] Foreign Application Priority Data

Nov. 10, 1994 [JP] Japan .................. 6-276429

[51] Int. Cl.$^6$ .................................................. G06F 9/44
[52] U.S. Cl. ........................................................ 395/701
[58] Field of Search ........................ 395/701, 709, 395/705, 703

[56] References Cited

U.S. PATENT DOCUMENTS

| | | | |
|---|---|---|---|
| 5,212,790 | 5/1993 | Ohler et al. ............................. | 395/701 |
| 5,530,869 | 6/1996 | Salle ...................................... | 395/701 |
| 5,596,752 | 1/1997 | Knudsen et al. ........................ | 395/701 |
| 5,603,034 | 2/1997 | Swanson ................................ | 395/701 |
| 5,640,566 | 6/1997 | Victor et al. ........................... | 395/701 |

*Primary Examiner*—Kevin A. Kriess
*Attorney, Agent, or Firm*—A. Pete Tennent

[57] ABSTRACT

To perform the modularization and use in a component format of a program and to efficiently create the program. Divide Operations into two, Primitive and Composite Operations, and further classify Composite Operations into Loop, Sequence, and Selection. Then, prepare methods for defining actions common to Operations, methods for defining actions common to Composite Operations, methods for defining actions peculiar to Loop Composite Operations, methods for defining actions peculiar to Sequence Composite Operations, methods for defining actions peculiar to Selection Composite Operations, and methods for defining actions peculiar to Primitive Operations so as to easily and readily create a program with methods for defining actions peculiar individual Operations, a means for inputting data, and a means for making up individual Operations into a tree structure.

11 Claims, 12 Drawing Sheets

| Loop counter |
|---|
| Reset at the entrance<br>Increment by +1 for<br>every repetition |

| Value counter |
|---|
| Reset at the entrance<br>Increment by +2 with P1<br>Increment by -1 with P2 |

PROGRAM CREATION APPARATUS FOR REACTIVE SYSTEMS

BACKGROUND OF THE INVENTION

1. Field of the Invention

The present invention refers to an apparatus and method for creating programs, more particularly to an apparatus and method for creating object-oriented programs for reactive systems.

2. Description of the Related Art

A reactive system, such as an automatic teller machine (ATM) and a POS system terminal, usually comprises a display unit for displaying a series of panels and an input unit, such as a button, keypad, and magnetic stripe reader, displays various prompts, and enables a user to select an appropriate action. That is, a user generates an input Event by pressing an appropriate button or key and receives feedback of information from the panel to interact with a reactive system.

As used herein, "data" means a representation of facts, objects, concepts or instructions in a formalized manner suitable for communication, interpretation, or processing by human or automatic means. Also, as used herein, "computer" means a device capable of performing the functions of a Turing Machine, including a processing unit, microcomputer, minicomputer, or mainframe computer. A Turing Machine is a well-known computer science concept and is explained in *Encyclopedia of Computer Science*, Ed. Anthony Ralston, ISBN 0-88405-321-0 ("Ralston"). Ralston is specifically incorporated herein by reference. "Memory" or "storage unit" means one or more devices for storing data for use by a computer, including electronic, magnetic, and electromagnetic memory.

Various data representations are used in connection with computers in order to manipulate information. Different representations are used depending upon the objective. For example, some representations are better suited for performing arithmetic operations (e.g., adding, subtracting, multiplying), while others may be particularly suited for text processing (e.g., word processing). Still other representations flay be better suited for knowledge representation. The choice of representation is typically of no direct concern to an end user of a computer or computer program, however it is nevertheless important since it may profoundly affect the efficiency of a system. Data representations and operations thereon are discussed in the *Art of Computer Programming*, D. E. Knuth, vols. 1–3, Addison-Wesley, ISBN 0-201-03809-9, -03802-1, and -03803-X, respectively ("Knuth"), An Introduction to Database Systems, C. J. Date, vols 1–2, Addison-Wesley, ISBN 0-201-14452-2 and -14474-3, respectively ("Date"), and Object-Oriented Analysis and Design with Applications, G. Booch, Benjamin/Cummings, ISBN 0-8053-5340-2 ("Booch"), each of which is specifically incorporated herein by reference.

An Operational Flow of this reactive system shows the sequence of input Events to be handled and the action routine related to input Events. Here, the example in FIG. 14 is considered. Symbols P1 and P2 denote input Events generated by pressing the buttons P1 and P2, respectively. The sequence of input Events being expected in this Operational Flow is a successive pressing of the buttons P1 followed by P2, where these pressing actions is performed one time or repeated. Two counters, loop counter and value counter, operate during the operation both counters are reset to 0 at the entrance of the Loop. The Loop counter is incremented by 1 for every repetition, while the value counter is incremented by 2 on pressing P1 and decremented by 1 on pressing P2. At the exit from the Loop after passing through the Loop N times, either counter ought to become N.

This Operational Flow has a nested and hierarchical logical structure. The lowest level is an Operation corresponding to an input Event whereas a higher level becomes a Composite Operation in which Operations at the lowest level are combined by such a method as Sequential, Selection, and Loop.

The control of an Operational Flow is a mechanism for verifying whether an input Event conforms to the specification of the Operational Flow or not and executing a defined action routine to handle the input Event. A finite state machine is usually used to execute the control of this Operational Flow. The finite state machine defines a diagram of state transition in states and Events. If a certain Event occurs in a certain state, the transition into a new state is accomplished and an action routine related to the state transition is executed.

FIG. 15 illustrates the Operational Flow in FIG. 14 in the form of a finite state machine. In this finite state machine, actions related to three states (s0, s1, and s2), two Events (P1 and P2), and three state transitions are shown. Herein, it should be noted that the Event P1 is shown at two places. One is a transition from s0 to s1, consisting of a reset action and actions related to the Loop counter and the Value counter. The other is a transition from s2 to s1, consisting of the same actions except the reset action.

This method for using a finite state machine is a useful method that has so far been employed, but has several problems as are seen also from the example shown in FIG. 15. The general problems in implementing a finite state machine are as follows:

1. Depending on the number of input Events increasing or the Operational Flow becoming complicated, the number of states increases exponentially. Some attempts have been made to cope with this, but no mention will be made of them here.
2. For enabling the action routine to perform a data exchange, a global data area becomes necessary.
3. When an Operational Flow is transformed into a finite state machine, the logical structure of an Operational Flow becomes lost. The action routine for an input Event comes to include not only the processing of the Event but also processing for a higher level logical structure in the Operational Flow.

For example, an action related to the transition from s0 to s1 by pressing the button P1 in FIG. 15 includes a "reset" action logically belonging to Loop processing. Also, an Event that appeared only once in the Operational Flow may appears more than once in a finite state machine. Furthermore, an action for each of the Events appearing multiple times differs slightly depending on its role in the logical structure of the Operational Flow.

These difficult problems bring about the following unfavorable results:

1. Depending on the number of input Events increasing or an Operational Flow becoming complicated, implementation becomes difficult. A tool as such a parser generator, used for compiler construction, may help to generate a list of states and Events corresponding to states. However, a look-ahead generally supposed by the generator makes a parser useless in such a reactive system as must be executed immediately when an Event occurs.

2. Customizing a program requires a complete understanding of the whole finite state machine including the logical structure implicitly contained in the Operational Flow and data maintained by the logical structure. Since a seemingly small change, for example, such as the move or removal of an Event, appears at several places, all of the relevant places must be modified, or when the role in a higher logical structure happens to change, measures to meet other Events may also be required. This role includes the initialization of several data items in entry into a Loop. Since all data are global and the scoping mechanism is unavailable, it is difficult to understand which section of the action routine belongs to any of the logical structures in the Operational Flow.

Let a new button P3 be introduced and an example of customization be taken into consideration. This button P3 does not change a value of any counter. As shown in FIG. 16, a new Operational Flow is so constructed that the button P3 is pressed in place of the button P1.

FIG. 17 shows a case of representing FIG. 16 with a finite state machine. Here, there are two transitions related to P3. Although P3 is not to change a value of any counter, every action for the transitions related to P3 comes to change values of both counters. This fact suggests that those who want to customize an Operational Flow must have a global knowledge about the structure of the whole Operational Flow and the role of actions related to the Events in the whole Operational Flow. In other words, only the knowledge that P3 does not change a value of any counter is insufficient for an introduction of the button P3.

A guideline on the procedure for creating a structured program includes structured programming. This includes the case of using a tree structure for describing the flow of a highly abstract program, but does not differ from an ordinary programming format in the lower stages of abstraction. Japanese Patent Laid-Open Publication No. 67135/1986 presents an example of using such structured programming.

Furthermore, there is also a method for the development of software, called Jackson System Development (hereinafter referred to as JSD). JSD supports a Modeling phase, Network phase, and Implementation phase for development of software. in this Modeling phase, the concept of Event is important and a combination of Sequence, Loop, and Selection is used to represent in what sequence each of Events occurs. For example, the Event tree structure shown in FIG. 18 indicates that Event B or C follows Event A more than 0 times and finally Event D follows. A, B, B, C, B, C, C, B, and D is one example of an Event procession. Generally, a tree structure of Events shows a restriction on the sequence of Events for a process. The process has data within it and data is modified.

A node representing a Sequence, Loop, or Selection of such a tree structure is not necessarily connected to any action because an Event is the central concept. Data is held and modified by the processing of an Event. Consequently, the nodes representing a Sequence, Loop, and Selection forming intermediate nodes are only for the purpose of pointing out a group of simple Events, but do not perform any processing or any delivery of data.

The Network phase of JSD shows a mutual relationship between inputs, outputs, and other actions of plural processes represented using a tree structure of individual Events. The Implementation phase considers that plural processes are implemented with a single main program and subroutine class or other efficient implementations in an ordinary computer system.

In this way, the above-mentioned conventional examples are by no means able to solve defects in implementing an Operational Flow in the form of a finite state machine.

Problems to be Solved by the Invention

Thus, it is the object of the present invention to solve the shortcomings in the background art and to provide a method and apparatus for carrying out such points as the reuse, bottom-up design, and implementation of programs while evading the difficulties in actual coding (programming).

Concretely, it is one object of the present invention to separate the processing for a higher level logical structure of an Operational Event from the very processing of Events. Also, it is another object of the present invention to forbid other Operations other than those requiring an access to data and dispersing data.

It is a further object of the present invention to facilitate and simplify programming by using an apparatus capable of implementing these methods.

SUMMARY OF THE INVENTION

To achieve the objects mentioned above, the present invention provides a program creation apparatus for reactive systems comprising: a parts storage unit for storing methods defining actions common to operations, methods defining actions common to composite operations, methods defining actions peculiar to loop composite operations, methods defining actions peculiar to sequence composite operations, methods defining actions peculiar to selection composite operations, and methods defining actions peculiar to primitive operations; display means; input means; flow editor means for creating and modifying a tree structure corresponding to the operational flow of a program by a combination of objects of said loop composite operations, objects of said sequence composite operations, objects of said selection composite operation, and objects of said primitive operation in response to a signal from said input means; flow browser means for enabling said display means to display said tree structure in any hierarchical class in response to a signal from said input means; and action editor means for enabling a user to input methods defining an action peculiar to each operation and data to be handled by the operation and for extracting out and combining the methods needed for the operation from said parts storage device.

Here, each method controls said operational flow and data processing through mutual communication by issuing messages. Hereby, each Operation is made into a part and programming can be more efficient and more simply carried out.

Letting methods defining actions common to operations include a responder method transferring a responder message for searching for an operation to handle data to the parent operation and letting methods defining actions common to Composite Operations include a start method for issuing an initialAction message, controlChildren message, and finalAction message in response to a start message from the parent operation and a canContinue method for transferring a canContinue message for requesting the parent operation to inquire whether an operation to be executed after the current operation is executable, then individual operations become able to be divided into hierarchical classes and componentization comes to be accomplished within each operation.

Furthermore, it is also considered that the methods peculiar to loop composite operations are so arranged as to include a controlChildren method that issues a canStart message inquiring whether a child operation is executable or not in response to a controlChildren message and, if executable, issues a start message or, if the child operation does not perform whatever action, issues a canContinue message to the current operation itself and a canStart method that issues a canStart message for inquiring whether a child operation is executable or not in response to a canStart message from the parent operation.

Still further, it is also considered that the methods peculiar to sequence composite operations are so arranged as to include a controlChildren method that issues a start message to child operations in sequence in response to a controlChildren message, a canStart method that issues a canStart message for inquiring whether a child operation is executable or not in response to a canStart message from the parent operation, and a second canContinue method that inquires whether an operation to be executed after the current operation is executable.

It is also considered that the aforesaid methods peculiar to selection composite operations are so arranged as to include a controlChildren method that issues a canStart message inquiring whether a child operation is executable or not in response to a controlChild message and, if executable, issues a start message, or if the child operation does not perform whatever action, issues a canContinue message to the current operation itself and a canStart method that issues a canStart message for inquiring whether a child operation is executable or not in response to a canStart message from the parent operation.

Furthermore, it is also considered that methods defining actions common to operations are arranged to include a responder method that transfers a responder message for searching for an operation to handle data to the parent operation while methods defining actions peculiar to primitive operations are so arranged to include a start method that issues a handleEvent message for calling a handleEvent method that handles an Event as a primitive operation in response to a start message from the parent operation and a canStart method that returns a decision on whether an input event is executable or not from a comparison with the expected event to the parent operation.

When the action editor means, for the purpose of an input concerning loop composite operations, prompts inputs methods defining an initial action for an initialAction message, a final action for a final message, actions to be performed for every repetition, and, if there is data to be handled in a loop composite operation, the relevant data and a responder method that performs management of the data.

When the action editor means, for the purpose of an input concerning sequence composite operations and selection composite operations, prompts inputs methods defining an initial action for an initialAction message, a final action for a final message, and, if there is data to be handled in a sequence composite operation, the relevant data and a responder method that performs management of the data.

Also, when the action editor means, for the purpose of an input concerning primitive operations, prompts inputs an event to be handled and methods defining actions for the Event.

Also, another aspect of the present invention may further have program storage means for storing the program created, including a tree structure corresponding to the operational flow and the operation objects corresponding to the nodes of its mechanism image and may be so arranged that the flow browser means can extract an existing program from the program storage means and display it on the display device and the flow editor means can instruct the modification of an existing program. In this way, an existing program can be reused and programming becomes more efficient.

Further, another aspect of the present invention may be considered to further have a means for simulating a reactive system to execute a program created and a tracer means for displaying which section of the program created is being executed on the display means. In this way, a program created can also be tested.

DESCRIPTION OF SYMBOLS

Figure 1:
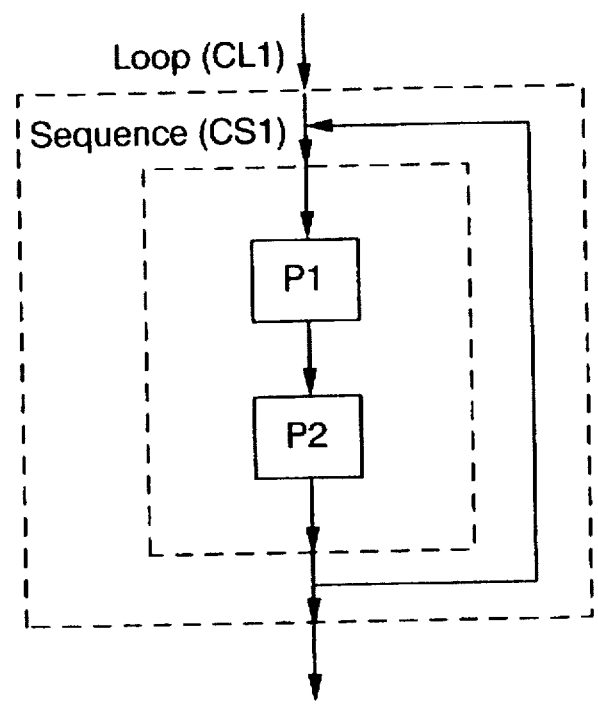
FIG. 1 is a flowchart illustrating one example of Operations.

100 ... Processing unit
110 ... Flow browser
120 ... Flow editor
130 ... Action editor
140 ... Tracer
102 ... Display unit
104 ... Input/Output unit
106 ... Program storage unit
108 ... Parts storage unit

DESCRIPTION OF A PREFERRED EMBODIMENT

From the standpoint of Operations that a user performs in accordance with the requirements of a reactive system, system analysis starts. The relevant Operations are classified into Primitive Operations and Composite Operations.

This Primitive Operation represents a simple action by a user using an input device (such as a button or keypad). For example, pressing the buttons P1, P2 as is shown in FIG. 1 is a Primitive Operation.

Figure 2:
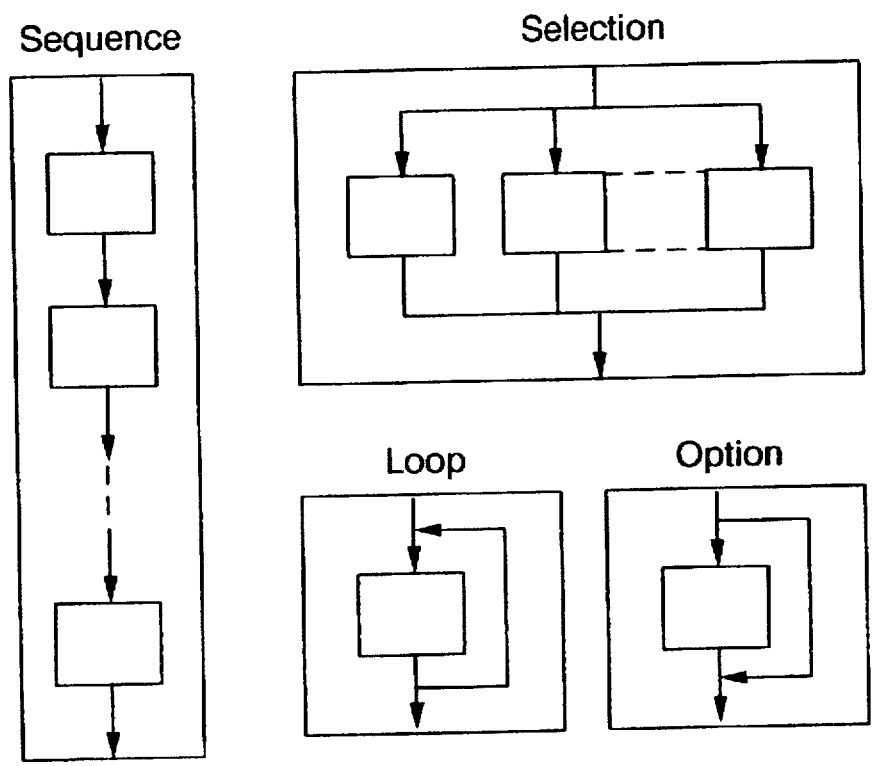
FIG. 2 is a flowchart illustrating the types of Operations.

In contrast with a Primitive Operation that is explicitly described in the specification of a system as usual, a Composite Operation is a logical set of either Primitive Operations or other Composite Operations. As shown in FIG. 1, for example, sequentially pressing the buttons P1 and P2 is a Composite Operation and this is a sequential combination of two Primitive Operations. Actions of depressing P1 and P2 are referred to as member Operations of the Composite Operation. FIG. 1 also shows a Loop Composite Operation (CL1). This CL1 executes the repetition of a member Operation CS1. As shown in FIG. 2, there is a variety of Composite Operations.

Figure 3:
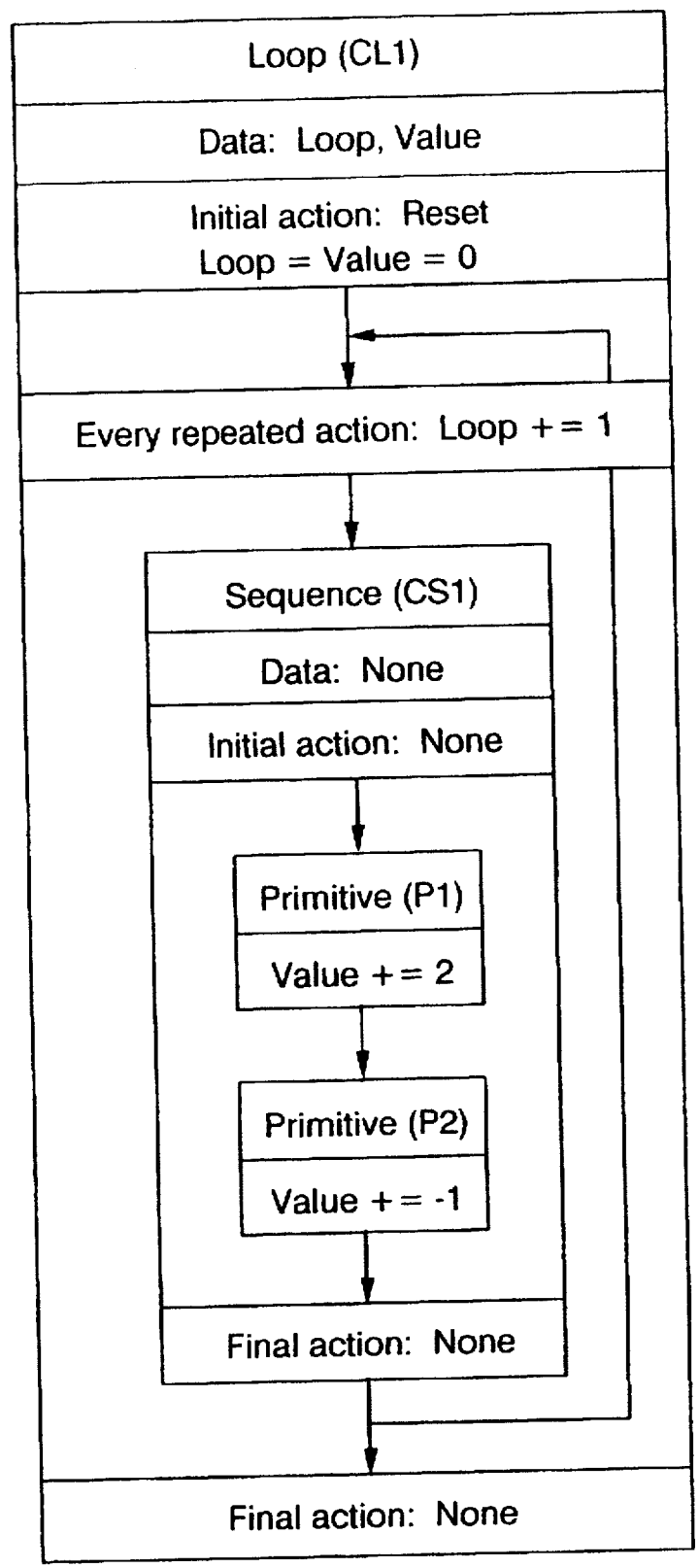
FIG. 3 is a flowchart illustrating the details of Operations.
Figure 14:
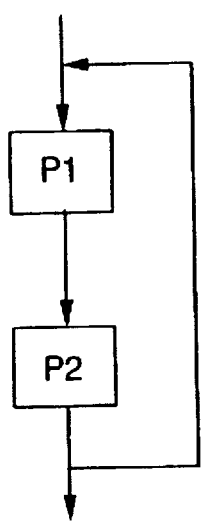
FIG. 14 is a flowchart illustrating one example of an Operational Flow.

By considering the example in FIG. 14, actions and data will be attempted to be related to an Operation. The Primitive Operations P1 and P2 increment a value counter by 2 and decrement it by 1. The Loop Composite Operation CL1 includes two counters, a Loop, and a Value. In general, the Loop Composite Operation CL1 has two actions, i.e., initial action and final action. These actions are executed at the entrance of the Operation and at the exit of the Operation, respectively. For example, the Loop Operation CL1 has an initial action to initialize two counters and an empty final action. In addition, the CL1 has "eachRepeat" actions that increment the Loop counter by one each time. FIG. 3 is an example in a nested box format.

Figure 4:
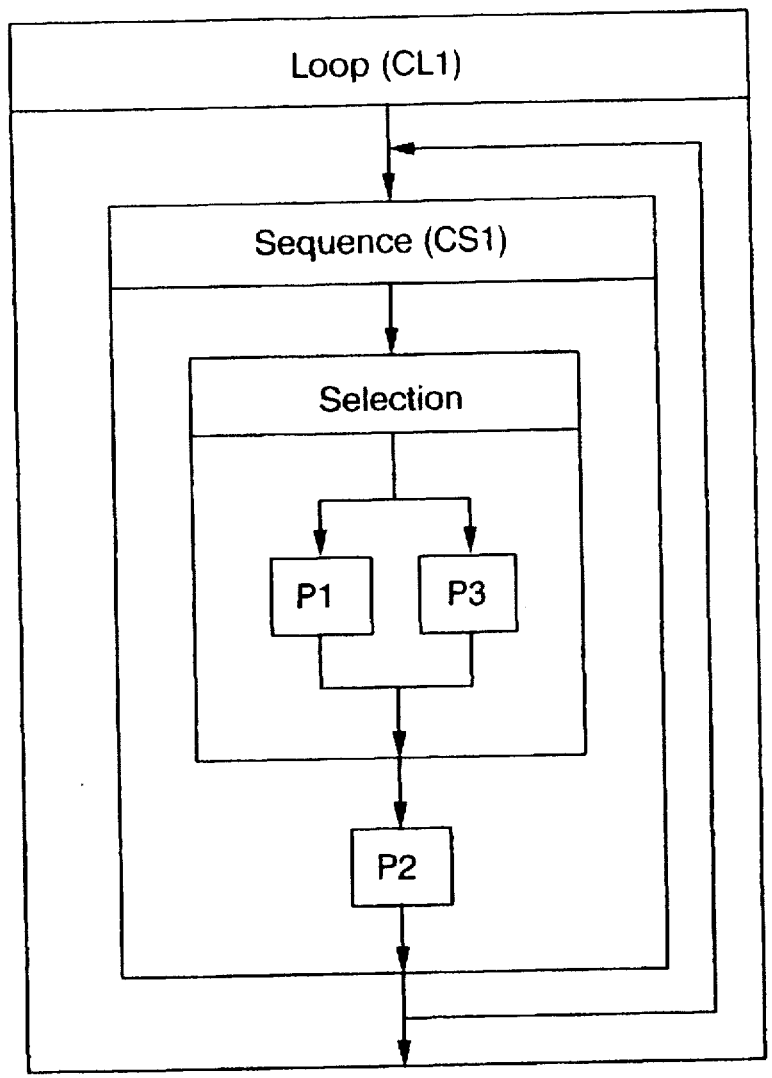
FIG. 4 is a flowchart illustrating another example of Operations.
Figure 16:
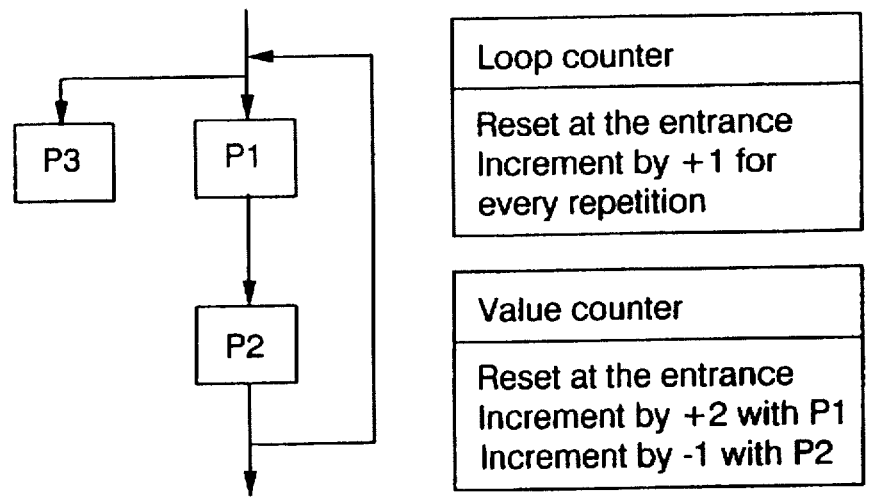
FIG. 16 is a drawing illustrating another example of an Operational Flow.
Figure 17:
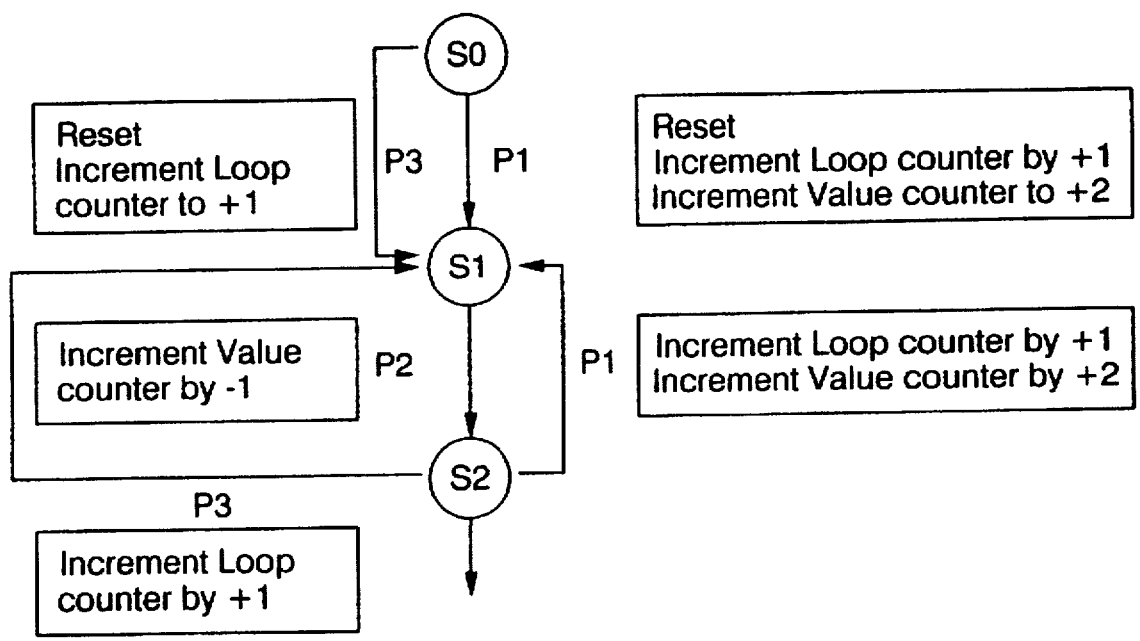
FIG. 17 is a drawing illustrating the finite state machine in FIG. 16.
Figure 18:
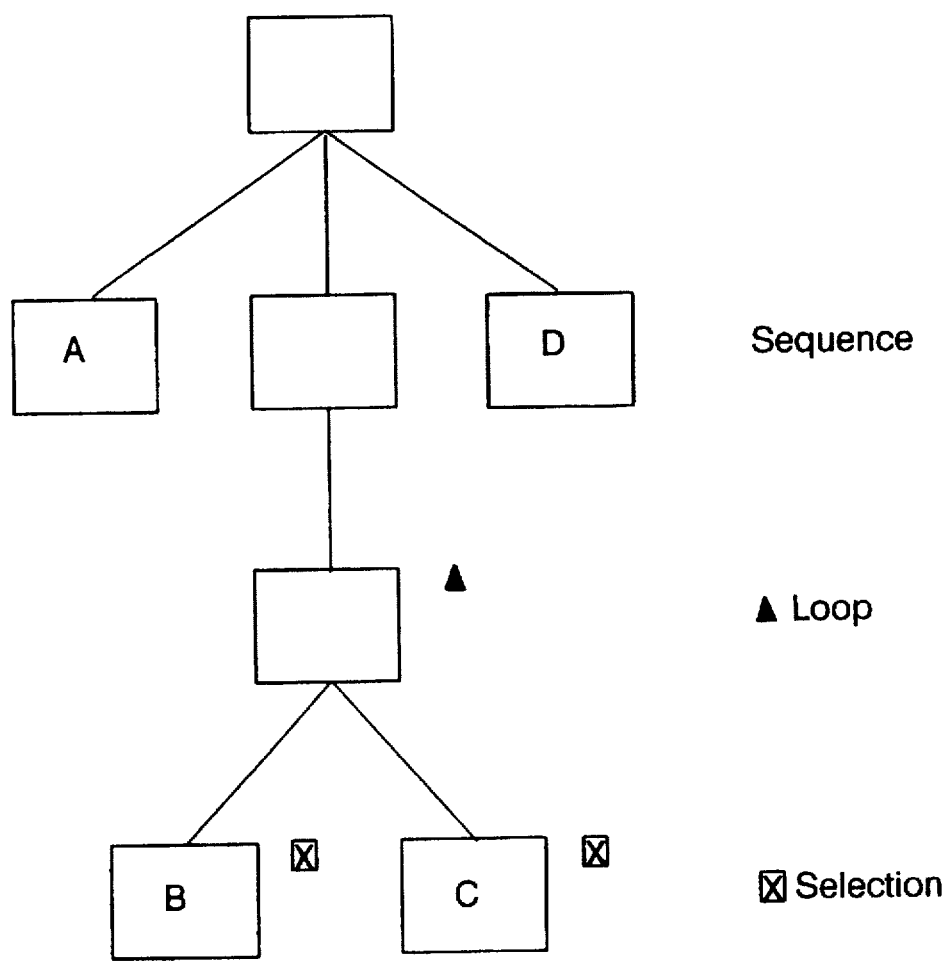
FIG. 18 is an explanatory drawing of the background art.

FIG. 4 shows a simplification of the customized system shown in FIG. 16. A Primitive Operation representing the button P3 as well as a selection Operation representing Primitive Operations P1 and P3 are added here. The selection Operation is an Operation to replace the Primitive Operation P1 as an element in the Operational Flow.

Figure 5:
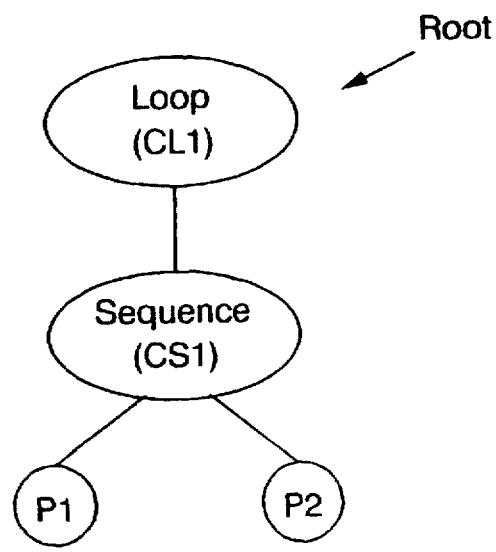
FIG. 5 is a drawing illustrating a tree structure of Operations.

An Operation recognized like this is modeled as an Operation Object and implemented as an instance of "Operation" class (to be exact, one of its derived classes). The Object of a Composite Operation includes a reference to an Operation Object representing its member Operation. In this way, the Operational Flow of a whole system is represented as a tree of Operational Objects and a Leaf of the tree represents a Primitive Operation. FIG. 5 shows a tree representation of the system of FIG. 14.

The present invention proposes a hierarchy of classes in modeling the Operations mentioned above. That is, the Operation class has data, eventSource, and contains an initialize method, start method, canstart method, responder method, and computeES method. This Operation class is referred to as a base class. A derived class of this Operation class is either a Primitive class or a Composite class. The Primitive class has an initialize method, start method, canStart method, handleEvent method, and computeES method, whereas the Composite class has initialize method, a start method, canContinue method, an initialAction method, controlChildren method, and finalAction method.

The Composite class further has derived classes, a Sequence class, Selection class, and Loop class. The Sequence class, Selection class, and Loop class each further have an initialize method, canStart method, controlChildren method, and computeES method. In addition, the Sequence class has a canContinue method and the Loop class has a eachRepeat method.

It can be defined to provide this Primitive class as well as a Sequence class, a Selection class, and a Loop class with derived classes thereof, and define methods peculiar to each of them so that each of them may fulfill a function necessary for its Operation.

One other class than these is an ExpectedEvent class. This is connected to a Primitive class, which shows that the Primitive class is expected to handle an event defined by the ExpectedEvent class. The ExpectedEvent class has an isReady method and two derived classes, which are, in this case, a Button class and TimeOut class, corresponding to a button Operation and timeout Operation required for a reactive system. Since what event should be handled must also be stored, they hold such data as Keycode and time. Also, as derived classes of the ExpectedEvent class, they have an isReady method.

Hereinafter, basic matters in an object-oriented system will be described and then one example of a system using Objects having such classes will be described, thereby showing how the system works.

Figure 7:
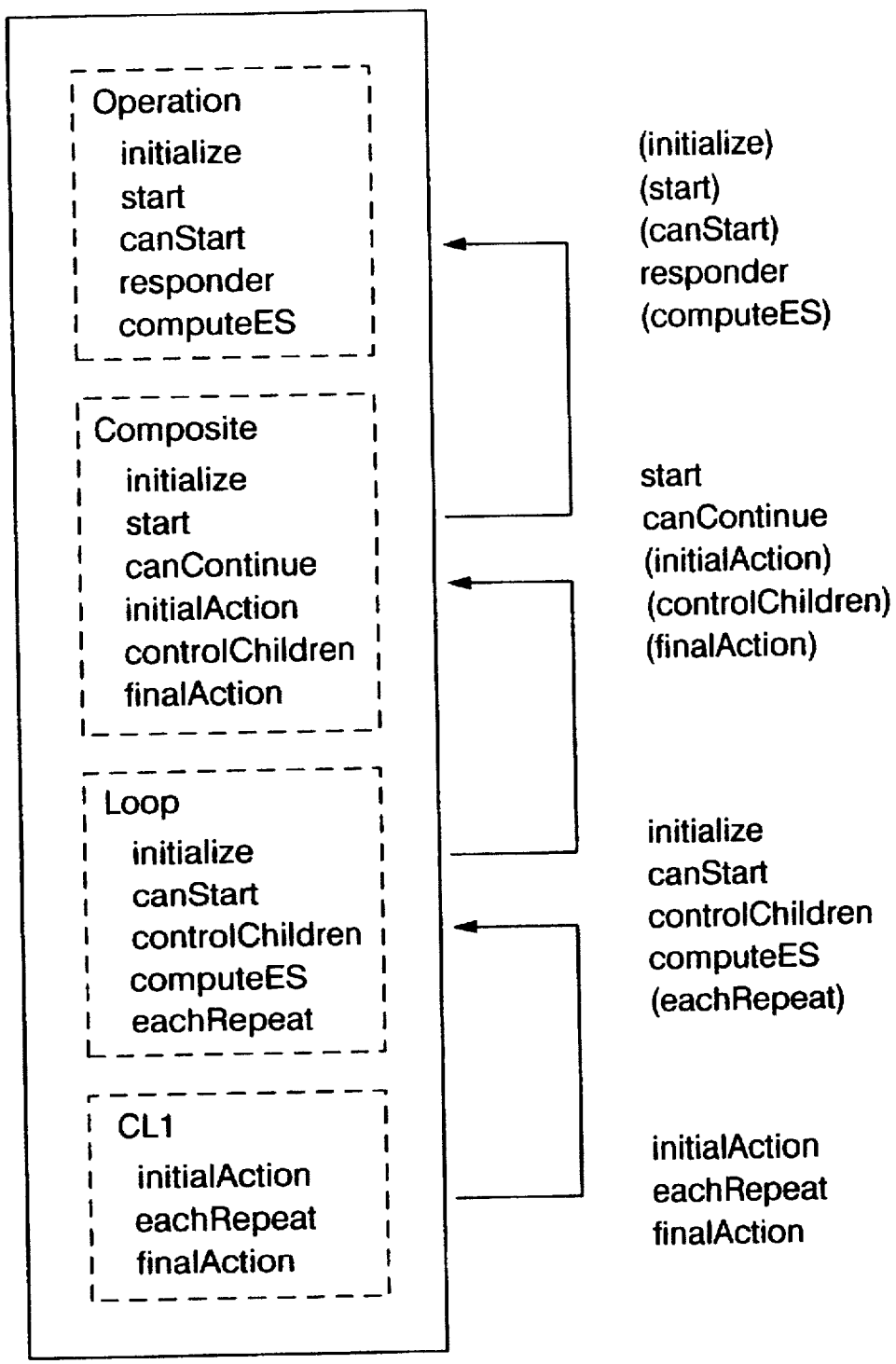
FIG. 7 is a drawing illustrating one example of methods included in Operations.

In an object-oriented system, plural objects mutually transfer messages and each Object performs an action appropriate to these messages, thereby accomplishing a system function. An Object is an instance of a certain class and has methods for the processing of messages grouped according to the hierarchical structure of classes inside. On receiving a message, the Object searches for a corresponding method from the group corresponding to a derived class to the group corresponding to a basic class in sequence and executes the method found first (inheritance). For example, in the case of the Loop Object in FIG. 7, ranging from the Operation class to the utmost derived class, a CL1 class, the CL1 class has the highest priority and a method of the Loop class is used for a method not defined in the CL1 class. In FIG. 7, priority is given to a derived class among the bracketed methods in the right column. As a result of similar views, it proves that a responder method is the only method that is directly used in the Operation class. In this way, a method redefined in a derived class among the methods defined in the basic class is said to override the method of the basic class and makes the methods in the derived class unable to be seen from outside, but a method in the basic class can be called from a method in the derived class.

Figure 8:
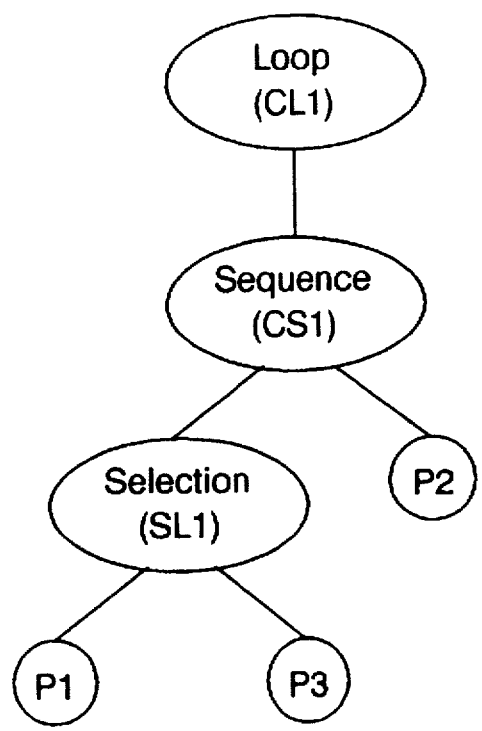
FIG. 8 is a drawing illustrating another tree structure of Operations.
Figure 9:
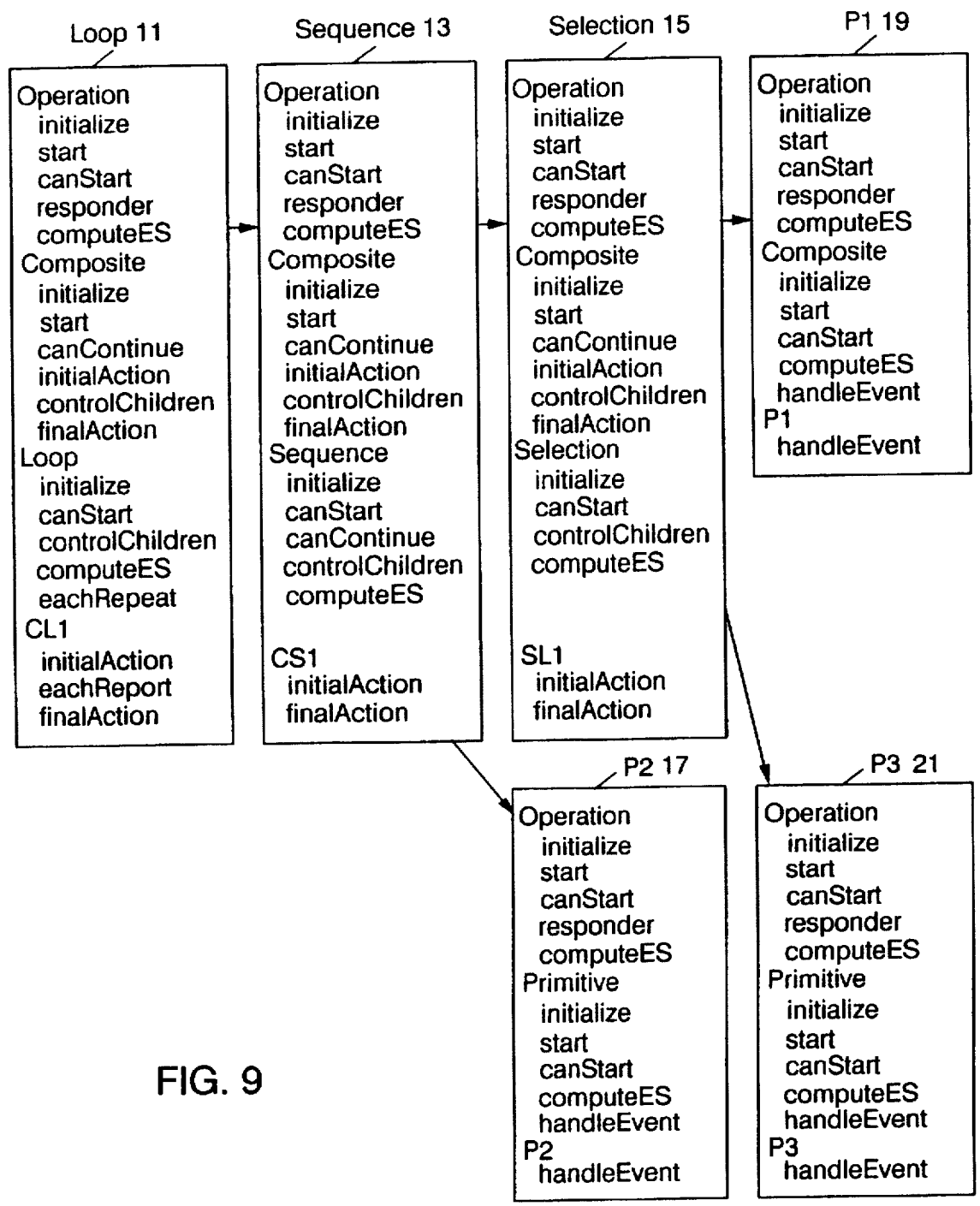
FIG. 9 is a drawing illustrating the details of the tree structure of FIG. 8.

With respect to the system shown in FIG. 8, a customized example of FIG. 5, actions will be shown. This system becomes a combination of Objects having such a hierarchical structure as shown in FIG. 9. Since an actual action differs among different classes even if having to the same method name, notice is to be taken also in the following explanation.

Actions of the system start with sending the following messages to the Root of Operational tree representing an Operational Flow:

1) initialize message;
2) computeES message; and
3) start message.

Thus, the description will be begun with the initialize message.

1.1 Initialize messages

At the start of a system, initialize messages are sent from the Root of an Operational tree representing the Operational Flow along the tree structure in sequence to all Leaves, thereby accomplishing the required initialization.

1.1.1. Initialize message to be sent to Loop 11

When an initialize message is sent to the Object, Loop 11:

1) An initialize method is searched for within Loop 11 and found in the Loop class. During execution,
   a) on calling an initialize method in the Composite class, the initialized message is recursively sent to the Sequence 13, a Child Operation of the Loop 11.
   b) Perform the processing of an initialization peculiar to the CL1 class. (If no processing of an initialization peculiar to the CL1 is needed, the initialize method is not overridden in the CL1 class. At that time, an initialize method in the Composite class is executed. In FIG. 9, this execution is omitted because of being unnecessary.)

1.1.1.1 Initialize method in the Composite class

An initialize method defined in the Composite class recursively sends initialize messages to all Child Operations.

1.1.2. Initialize message to be sent to Sequence 13

When an initialize message is sent to the Object (Sequence 13),

1) An initialize method is searched for within the Sequence 13 and found in the Sequence class.
2) The initialize method (Sequence class) is executed. During execution,
   a) on calling an initialize method in the Composite class, the initialize message is recursively sent to Selection 15 and P2 (17), two Child Operations of Sequence 13.
   b) Perform the initialization processing peculiar to the CS1 class.

1.1.3 Initialize message to be sent to Selection 15

When an initialize message is sent to the Object (Selection 15),

1) An initialize method is searched for within the Selection 15 and found in the Selection class.
2) The initialize method (Selection class) is executed. During execution,
   a) on calling an initialize method in the Composite class, the initialize message is recursively sent to P1 (19) and P3 (21), two Child Operations of Selection 15.
   b) Perform the initialization processing peculiar to the SL1 class.

1.1.4 Initialize message to be sent to P1 (19), P2 (17), and P3 (21)

Because of being a Primitive Operation, the processing of an initialization concerning these Operations is carried out. Unless anything otherwise executed, the initialize method need not to be overridden in the P1, P2, or P3 class.

1.2 ComputeES messages

The Event Source computation (computeES) is performed to know, in advance, the events that make a certain Object to be executable. The Event Source is an input device and other devices generating an event that can start an Operation, and includes keyboard and keypad.

Figure 10A:
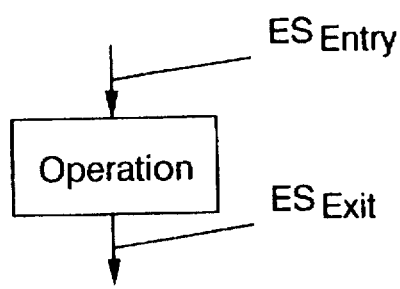
FIG. 10 is an illustration of Event Source computations.
Figure 10B:
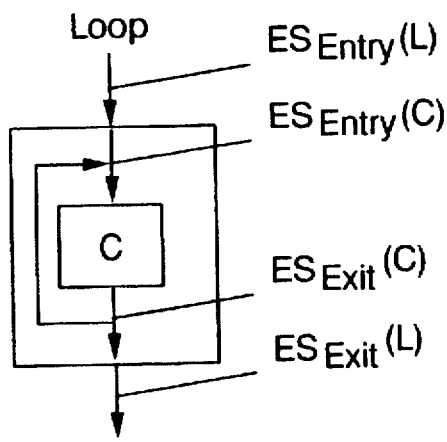
Figure 10C:
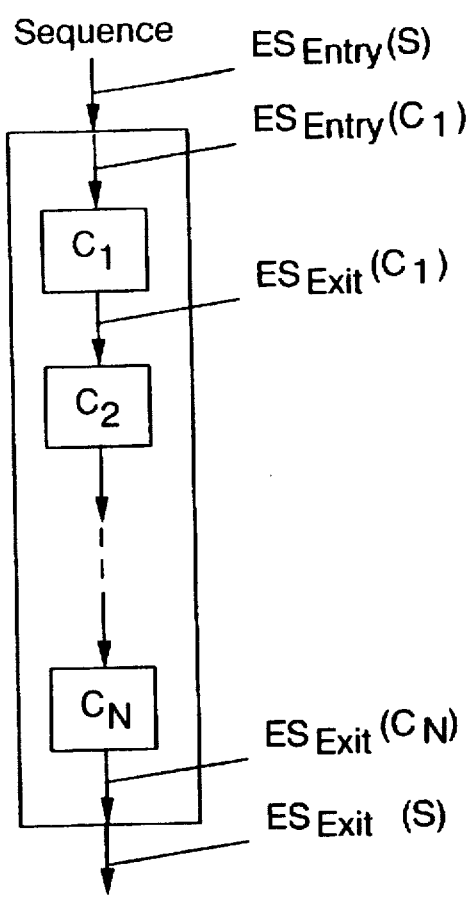

First, $ES_{EXIT}$ is introduced. As shown in FIG. 10 (a), this $ES_{EXIT}$ is an Event Source generating an event such as can start another Operation after a certain Operation ends. In contrast, $ES_{ENTRY}$ is an Event Source generating an event such as can start an Operation. For example, if the Operation of FIG. 10 (a) is a Primitive Operation, the $ES_{ENTRY}$ is naturally an Event Source (e.g., button P1) that is expected in the Primitive Operation.

If the above Operation is a Sequence Operation consisting of C1, ... Cn, the $ES_{EXIT}$ and the $ES_{ENTRY}$ are given by the following system of equations:

[Expression 1]

$$ES_{Entry}(S)=ES_{Entry}(C_1)$$

[Expression 2]

$$ES_{Exit}(C_i)=ES_{Entry}(C_{i+1}), (1<i<N-1)$$

[Expression 3]

$$ES_{Exit}(C_N)=ES_{Exit}(S)$$

Or, for a Selection Operation consisting of C1, ... Cn, the $ES_{EXIT}$ and $ES_{ENTRY}$ are given by the following system of equations:

[Expression 4]

$$ES_{Entry}(S)=U\ ES_{Entry}(C_i), (1 \leq i \leq N)$$

[Expression 5]

$$ES_{Exit}(C_i)=ES_{Exit}(S), (1 \leq i \leq N)$$

Further, for a Loop Operation having a Child Operation, C, the system of equations to be solved becomes as follows:

[Expression 6]

$$ES_{Entry}(L)=ES_{Entry}(C)$$

[Expression 7]

$$ES_{Exit}(C)=ES_{Exit}(L)\ U\ ES_{Entry}(C)$$

These systems of equations are solved bottom-up (from a Primitive Operation to the Root Operation of the Operational tree) as well as from the back to the front (from the $ES_{EXIT}$ to the $ES_{ENTRY}$ for any Operation, and from the last Child Operation to the first Child Operation for a Sequence Operation). That is, a computeES message to order the calculation of an Event Source includes the Event Source of the $ES_{EXIT}$ as a parameter. The $ES_{EXIT}$ in the ROOT, forming a boundary condition, is empty.

As described above, a computeES message is sent from the Root of the Operational tree representing the Operational flow in sequence along the tree structure to all Leaves, thus causing the calculation of Event Sources to proceed. The calculation of an Event Source varies with each individual Composite Operation class, but the computeES method suitable for each Composite Operation class is executed as is seen from the following description.

1.2.1 ComputeES message to be sent to Loop 11

When a computeES message is sent to Loop 11, 1) a computeES method is searched for within Loop 11 and found in the Loop class.
2) The computeES method (Loop class) is executed. During the execution:
   a) the computeES message is recursively and repeatedly sent to Sequence 13, a Child Operation of Loop 11, and the computation of the Event Source of Sequence 13 is executed.
   b) The calculation of the Event Source of Loop 13 is executed. Expression 6 and Expression 7 are to be referred to.

1.2.2 ComputeES message to be sent to Sequence 13

When a computeES message is sent to the Object, Sequence 13, 1) a computeES method is searched for within Sequence 13 and found in the Sequence class.
2) The computeES method (Sequence class) is executed. During the execution:
   a) the computeES message is recursively sent to Selection 15 and P2 (17), Child Operations of Sequence 13, and the computation of the Event Source of Selection 15 and P2 (17) is executed.
   b) The calculation of the Event Source of Sequence 13 is executed. Expression 1, Expression 2 and Expression 3 are to be referenced to.

1.2.3. ComputeES message to be sent to Selection 15 When a computeES message is sent to the Object, Selection 15, 1) a computeES method is searched for within Selection 15 and found in the Selection class.
2) The computeES method (Selection class) is executed. During the execution:
   a) the computeES message is recursively sent to P1 (19) and P3 (21), Child Operations of Selection 15, and the computation of the Event Source of P1 (19) and P3 (21) is executed.
   b) The calculation of the Event Source of Selection 15 is executed. Expression 4 and Expression 5 are to be referenced to.

1.2.4 ComputeES messages to be sent to P1 (19), P2 (17), and P3 (21)

Because P1, P2, and P3 are Primitive Operations, the computation of an Event Source is executed from the respective ExpectedEvent class.

1.3 Start messages

A start message is sent to the Root of an Operational tree representing the Operational Flow and a system Operation starts. During the execution of the start method of each Operation Object, a canStart message for determining a Child Operation to be executed next from among the plural Child Operations and a canContinue message for determining whether the current Operation can be returned to the Parent Operation after the completion are sent for the procession of the system Operation.

1.3.1 Start message to be sent to Loop 11

When a start message is sent to the Object, Loop 11,
1) a start method is searched for within Loop 11 and found in the Composite class.
2) The start method (Composite class) is executed and during the execution
   a) an initialAction message is sent to the Object itself (Loop 11).
      i) An initialAction method is searched for within Loop 11 and found in the CL1 class.
      ii) The initialAction method (CL1 class) is executed.
   b) A controlChildren method is sent to the Object itself (Loop 11).
      i) A controlChildren method is searched for within Loop 11 and found in the Loop class.
      ii) The controlChildren method (Loop class) is executed (cf. 1.3.1.1).
   c) A finalAction message is sent to the Object itself (Loop 11).
      i) A finalAction method is searched for within Loop 11 and found in the CL1 class.
      ii) The finalAction method (CL1 class) is executed.

1.3.1.1 ControlChildren method in the Loop class

A controlChidren method defined in the Loop class repeats the following:
1) Wait for the next input event.
2) Send a canStart message to Sequence 13, the Child Operation of Loop 11.
3) If the answer of the canStart message is 'YES', send a start message to Sequence 13, the Child Operation of Loop 11.
4) If the answer of the canStart message is 'NO' or 'NOP' (NOP means Possible No-Operation and indicates that it is possible to proceed to the next Operation without any processing), send a canContinue message to the Object itself. If the answer is 'YES', end the execution of the controlChildren method.
   a) The canContinue message sent to the Object itself is searched for in Loop 11 and found in the Composite class.
   b) The cancontinue method (Composite class) is executed.
5) Otherwise, issue an error message, ignore this input event, and return to the first step.

1.3.1.2 CanContinue method in the Composite class

A canContinue method defined in the Composite class generally sends a canContinue message to the Parent Operation (Operation Object), but returns 'YES' here because Loop 11 has no Parent Operation (Operation Object).

1.3.1.3 CanStart method in the Loop class

A canstart method defined in the Loop class sends a canstart message to a Child Operation and returns the result.

1.3.2 Start message to be sent to Sequence 13

When a start message is sent to the Object, Sequence 13,
1) a start method is searched for within Sequence 13 and found in the Composite class.
2) The start method (Composite class) is executed and during the execution
   a) An initialAction message is sent to the Object itself (Sequence 13).
      i) An initialAction method is searched for within Sequence 13 and found in the CL1 class.
      ii) The initialAction method (CS1 class) is executed.
   b) A controlChildren message is sent to the Object itself (Sequence 13).
      i) A controlChildren method is searched for within Sequence 13 and found in the Sequence class.
      ii) The controlChildren method (Sequence class) is executed (cf. 1.3.2.1).
   c) A finalAction message is sent to the Object itself (Sequence 13).
      i) A finalAction method is searched for within Sequence 13 and found in the CS1 class.
      ii) The finalAction method (CS1 class) is executed.

1.3.2.1 ControlChildren method in Sequence class

A controlChildren method defined in Sequence class sends a start message to Selection 15, the first Child Operation of Sequence 13, and P2 (17) in sequence. Generally, a controlChildren method defined in Sequence class sends a start message to all Child Operations in sequence, from the first Child to the last Child Operation, and thereafter ends.

1.3.2.2 CanContinue method in Sequence class

A canContinue method in this Sequence class is not used in the present example and therefore will be described in another example later.

1.3.2.3 CanStart method in the Sequence class

A canStart method defined in the Sequence class performs the following actions:
1) Set j=1.
2) Send a canStart message to the j-th Child Operation.
3-a) If the answer is 'YES', return 'YES' as an answer of the canStart.
3-b) If the answer is 'NO', return 'NO' as an answer of the canStart.
3-c) If the answer is 'NOP', set j=j+1 and, if j is less than the number of Child Operations, return to Step 2. Otherwise, return 'NOP' as an answer of the canStart.

1.3.3 Start message to be sent to Selection 15

When a start message is sent to the Object, Selection 15,
1) a start method is searched for within Selection 15 and found in the Composite class.
2) The start method (Composite class) is executed and during the execution
   a) an initialAction message is sent to the Object itself (Selection 15).
      i) An initialAction method is searched for within Selection 15 and found in the SL1 class.
      ii) The initialAction method (SL1 class) is executed.
   b) A controlChildren message is sent to the Object itself (Selection 15).
      i) A controlChildren method is searched for within Selection 15 and found in the Selection class.
      ii) The controlChildren method (Selection class) is executed (cf. 1.3.3.1).
   c) A finalAction message is sent to the Object itself (Selection 15).
      i) A finalAction method is searched for within Selection 15 and found in the SL1 class.

ii) The finalAction method (SL1 class) is executed.

1.3.3.1 ControlChildren method in the Selection class

A controlChildren method defined in the Selection class sends a canStart message to P1 (19) and P3 (21). Child Operations of itself in sequence, and, unless an answer of 'YES' is returned, down to the last Child Operation. If an answer of 'YES' is returned, return from the controlChildren method after sending a start message to the relevant Child Operation. If an answer of 'NO' is returned from all Child Operations, issue an error message, ignore this input Event, and return to the first step. If an answer of 'NOP' is returned from a certain Child Operation, send a canContinue message to the Object itself, (a canContinue method in the Composite class transfers a canContinue message to the Parent Operation as described above), return from the controlChildren method. Generally, a controlChildren method defined in the Selection class applies the above-mentioned steps to all Child Operations.

1.3.3.2 CanStart method in the Selection class

A canStart method defined in the Selection class performs the following actions:

1) Wait for the next Event.

2) Send a canStart message to the Child Operations in sequence (in the case of this example, P1 (19) and P3 (21).)

a) If the answer of the canStart message from a Child Operation is 'YES', return 'YES' as an answer.

b) If the answer of the canStart message from a Child Operation is 'NOP', return 'NOP' as an answer.

c) If the answer of the canStart message from a Child Operation is 'NO', proceed to the next Child Operation.

3) If the answer of the canStart message from all Child Operations is 'NO', return 'NO' as an answer.

1.3.4 Start message to be sent to P1 (19), P2 (17), and P3 (21)

Though a start message that is sent to the Object P1 (19), P2 (17), or P3 (21), which are the primitive operations will be simultaneously described, the execution is done separately.

1) a start method is searched for within P1 (19), P2 (17), or P3 (21) and found in the Primitive class.

2) The start method (Primitive class) is executed and, during execution, a) a handleEvent message is sent to the self Operation Object (P1 (19), P2 (17), or P3 (21)).

i) A handleEvent method is searched for within P1 (19), P2 (17), or P3 (21), and found in the P1 (19), P2 (17), or P3 class.

ii) The handleEvent method (the P1, P2, or P3 class) is executed. The handleEvent method in the P1, P2, or P3 class performs its respective original processing.

1.3.4.1 CanStart method in the Primitive class

Figure 6:
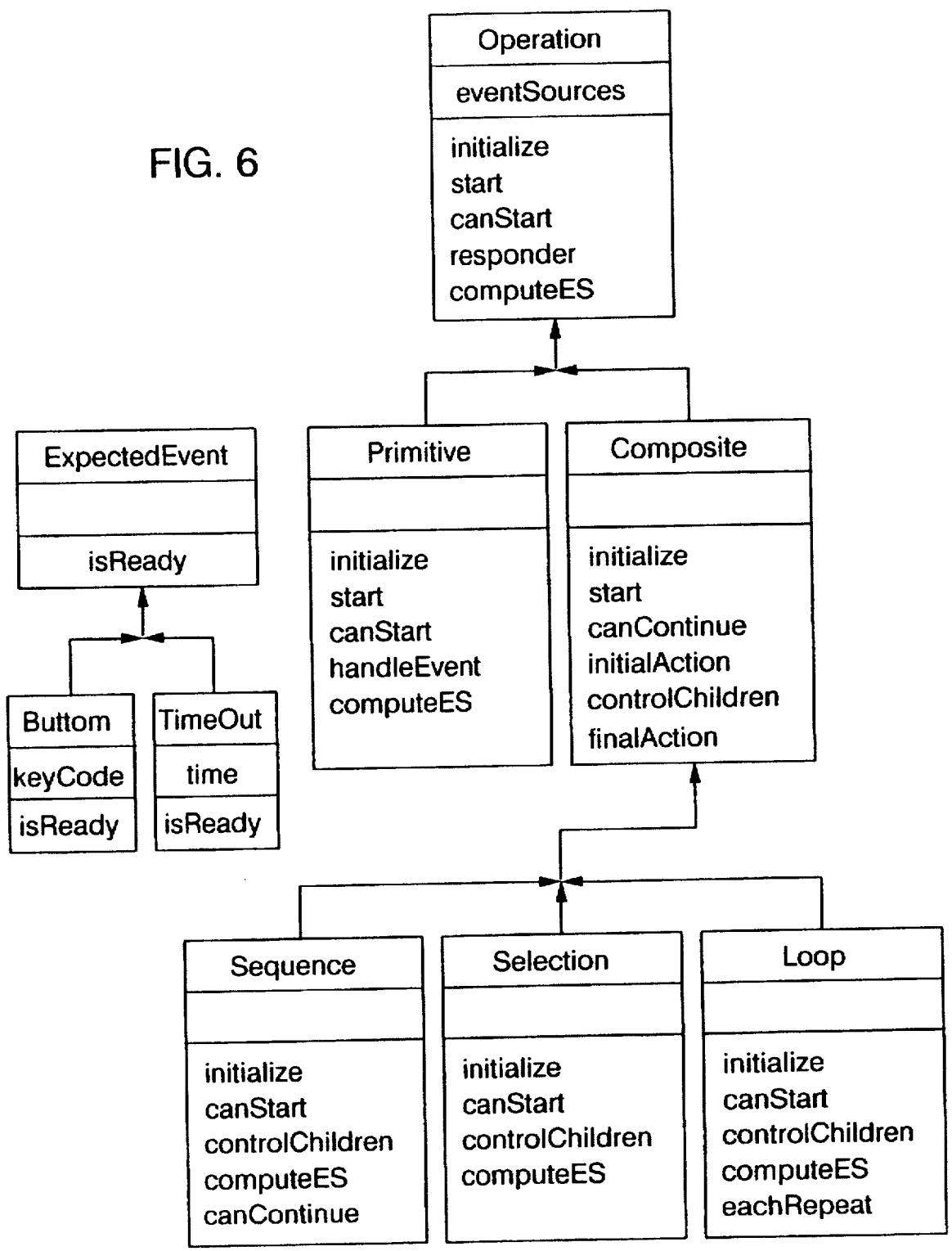
FIG. 6 is a drawing illustrating a model of Objects.

A canStart method in the Primitive class checks that the current input Event coincides with the ExpectedEvent corresponding to itself (sends an isReady message to the Expected Event. The isReady method in a derived class of the ExpectedEvent shown in FIG. 6 decides using data contained in it), and returns 'YES' if coincides or else 'NO' as an answer.

In the sections above, actions of the methods related to the Operational Flow that individual Operation Objects were described. However, the description of a canContinue method in the Sequence class of Sequence 13, since omitted as mentioned above, is performed here.

Figure 11:
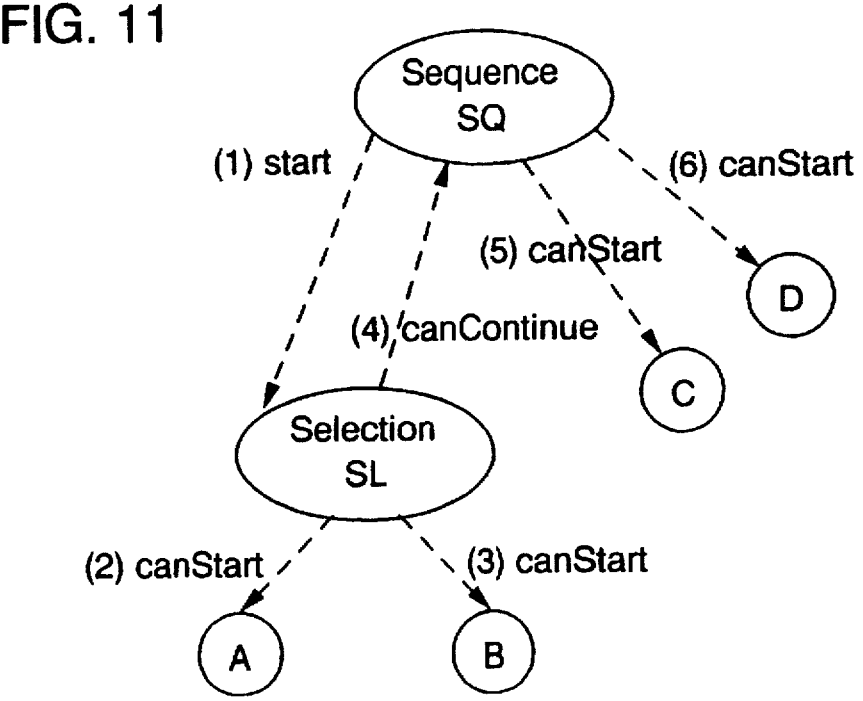
FIG. 11 is an explanatory drawing of actions in a canContinue method.

FIG. 11 shows one example. In this example, a Sequence Operation SQ forms the Root while its Child Operations are a Selection Operation SL and Operations C and D. The Child Operations of the Selection Operation SL are Operations A and B. The execution order of Child Operations of the Sequence Operation begins with the left side of FIG. 11, i.e., the Selection Operation SL. Let it be noted in advance that this is a case where Operation B can be skipped and may be empty and where an Event enabling Operation C (or D) to start is input.

When the processing of an initialize message and computeES message ends and a start message is given to the Root of an Operational tree, a start message in the Composite class of a Sequence Operation is executed. This start message sends an initialAction message to the Object itself and processing is executed by methods in the SQ class. Furthermore, a controlChildren message is sent to the Object itself and a controlChildren message in the Sequence class is executed (Section 1.3.2, above). This controlChildren method sends a start message to the Child Operations in sequence (Section 1.3.2.1, above). First, the start message comes to be sent here to the Selection Operation SL ((1) in FIG. 11). Then, the initialAction message is processed and the controlChildren message is processed as in Section 1.3.3, above. A controlChildren method in the Selection class sends a canStart message to the Child Operations in sequence ((2) and (3) in FIG. 11) as described in item 1.3.3.1.

Here, when Operation A, a Child Operation of the Selection Operation SL, returns 'NO' and Operation B returns 'NOP', the controlChildren method in the Selection class issues a canContinue message to the Object itself. Then, the canContinue method in the Composite class transfers a canContinue message to the Parent Operation ((4) in FIG. 11).

Herein, the canContinue method of a Sequence Operation, the Parent Operation, is retrieved and can be found in the Sequence class. Here, the following actions will be performed:

1) When the i-th Child Operation is in execution, set j=i.

2) Send a canStart message to the (j+1)-th Child Operation ((5) and (6) in FIG. 11).

3-a) If the answer is 'YES', return 'YES' as the answer of the canContinue.

3-b) If the answer is 'NO', return 'NO' as the answer of the canContinue.

3-c) If the answer is 'NOP', set j=j+1 and return to Step 2 if the value of j is less than the number of Child Operations. Otherwise, call a canContinue defined in the Composite class.

As with the above, the canContinue method defined in the Composite class sends a canContinue message to the Parent Operation.

The data flow will be described next: As described above, in addition to the start of a Child Operation, the Composite Operation Object itself has data, and the data is set or inquired about by the Child Operation Object. Since the data is encapsulated in the Composite Operation Object, the Composite Operation Object specifies a message that is sent by the Child Operation for setting data or inquiring about it. Or, to search for the Composite Operation including data, the Composite Operation Object provides a responder method.

Figure 12:
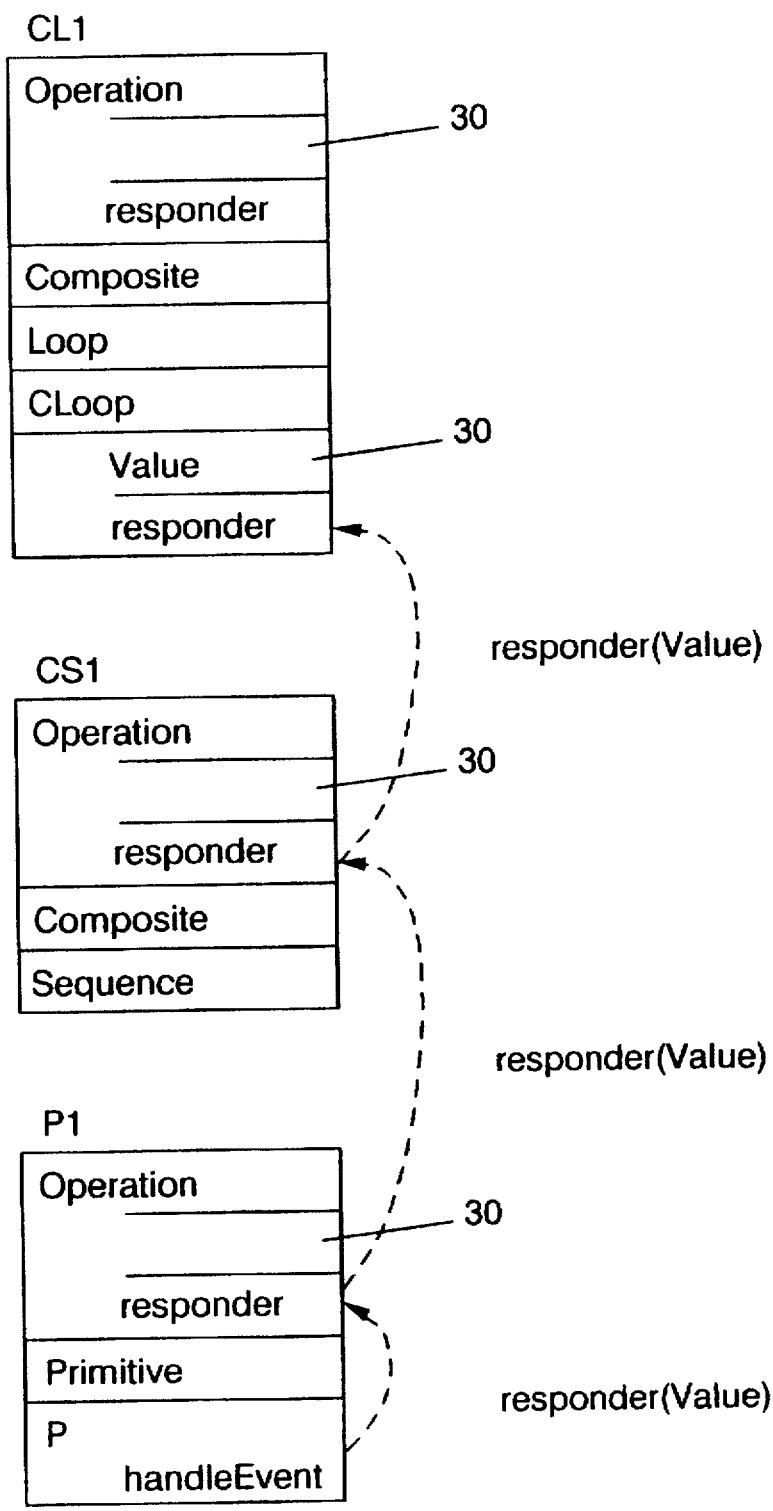
FIG. 12 is an explanatory drawing of actions in a responder method.

FIG. 12 is a simplification of part of FIG. 5. Here, Symbol 30 in every Operation denotes data. As shown in FIG. 3, the Loop Operation Object of FIG. 5 includes a Value counter.

The handleEvent method in the Primitive Operation P1 sends a responder message with a parameter "Value" representing the Value counter to the Object itself. There is a responder method in the self Operation class and the method of this class transfers a responder message to the Parent Operation Object, here to the Sequence Operation CS1. Since the Sequence Operation has a responder method only in the Operation class, the transfer is carried out to the Parent Operation CL1, similarly. A responder method is retrieved within the Operation CL1 and found in the C-Loop class. The responder of this class is overridden and a pointer indicating the self is returned. After Operation P1 obtained the pointer for Operation CL1, Operation P1 can send a message for updating data to the Operation CL1 and increments the Value count by 2.

In this way, it is found that no problem would prevail around with customization. As shown in FIG. 16, the introduction of the Primitive Operation P3 instead of P1 is attempted to be considered. FIG. 8 shows a tree structure in which Selection Object SL1 was inserted between the Sequence Operation CS1 and Primitive operation P1. The Loop Operation CL1 including a Value counter lies 3 levels above the P1. In this construction, if the responder method in the Operation class of the inserted Selection Composite Operation SL1 transfers a responder message from the Operation P1 to the Parent Operation CS1, the following is the same as described above. Thus, customization is easily accomplished.

Also, in a message communication between the Operation Objects, a significant effect is found to be exerted. That is, a message communication between the Operation Objects is performed from the Root of a operational tree only along the route to a certain Operation Object. More precisely, a Parent Operation Object can send a message (downward) only to its direct Child Operation Objects while a Child Operation Object can send a message (upward) only to its direct Parent Operation Object or its Ancestor Operation Objects. Between Sibling Operation Objects, there is no transfer of a message. This reduces the number of Operation Objects that a Primitive Operation Object affects and facilitates debugging and testing.

Furthermore, the simplification of debugging and testing holds true also in the following point: That is, data to be manipulated during the action of a system is held in a form being localized and scattered so that they may be accessible from the Operation Object which must be accessed by using a given message to the Operation Object holding the data but is inaccessible from the other Operation Objects. Data is held by the Ancestor Operation Object common at the lowest level among all Operation Objects that must access the data. This is forced by the fact that the Operation Object having data is searched for by a responder message. This "vertical" placement of data reduces the number of Operation Objects to modify or refer to data and facilitates debugging and testing.

In the system described above, the customization is facilitated and the independence, modularity, and the use of a component format can be enhanced. Accordingly, the use of this system enables a programming support tool to be simply and readily created.

Figure 13:
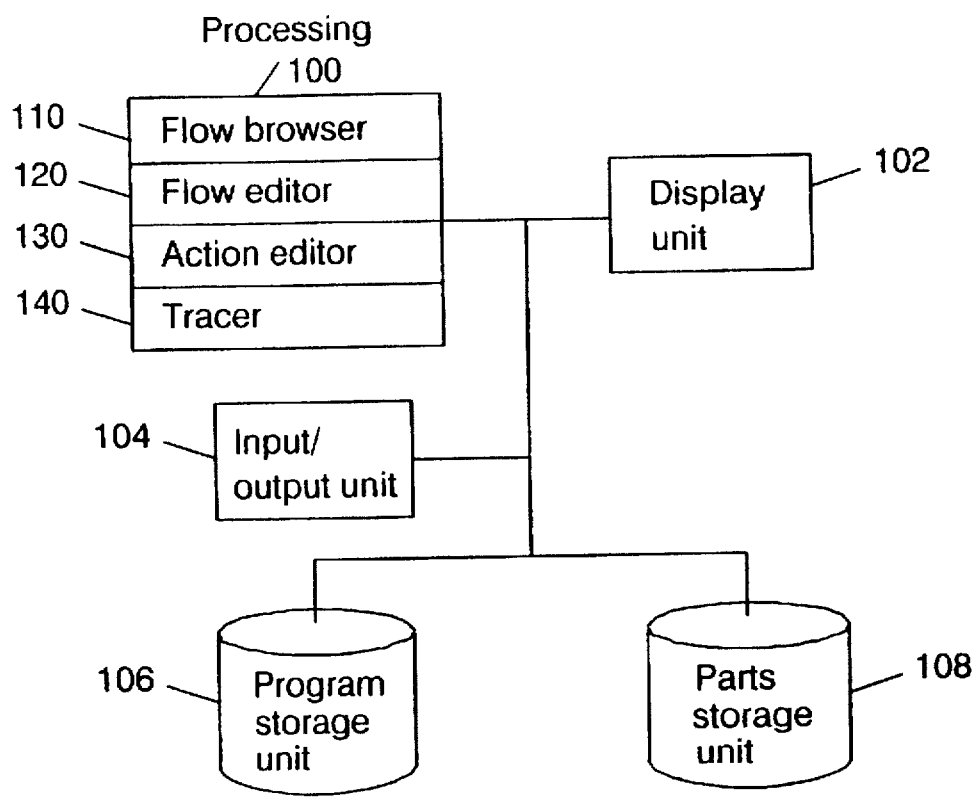
FIG. 13 is an explanatory drawing of programming tools.
Figure 15:
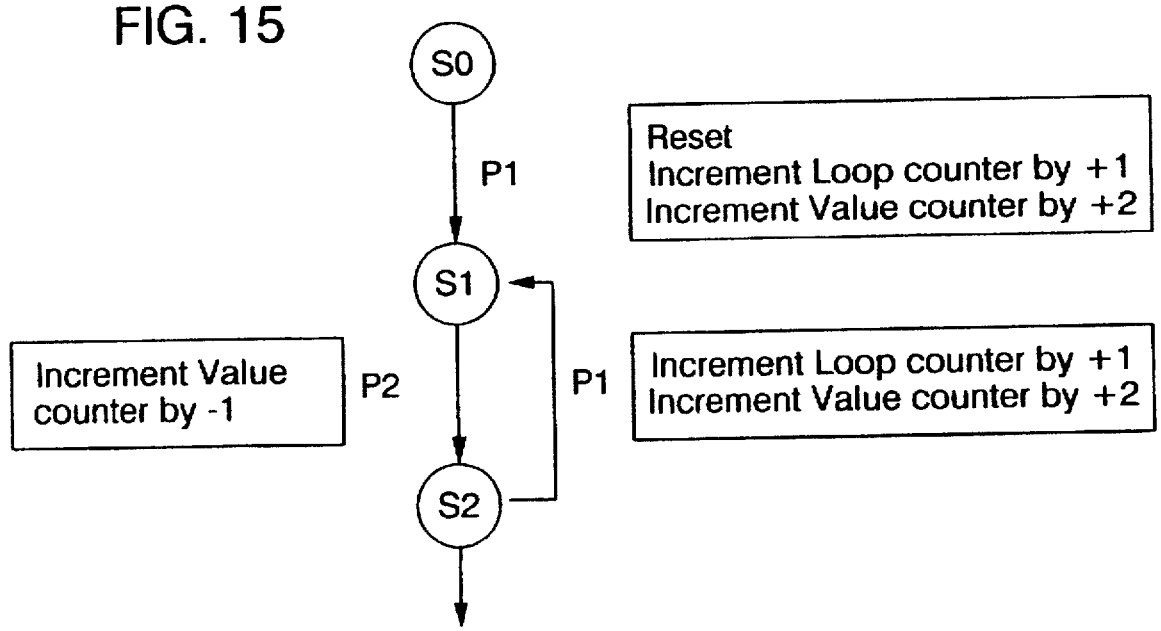
FIG. 15 is a drawing illustrating the finite state machine in FIG. 14.

FIG. 13 illustrates a block diagram of Programming tools. The processing unit 100 is connected to a parts storage unit 108 and a program storage unit 106. It is also connected to an input/output unit 104 such as a mouse, keypad, and printer. The results of processing, programs, and the like are arranged to be displayed on the display 102. The parts storage unit 108 stores the methods for defining actions common to Operations (e.g., responder method), the methods for defining actions common to Composite Operations (e.g., start method and canContinue method), the methods for defining actions peculiar to Loop Composite Operations, the methods fir defining actions peculiar to Sequence Composite Operations, the methods for defining actions peculiar to Selection Composite Operations, and the methods for defining actions peculiar to Primitive Operations. Furthermore, the program storage unit 106 stores programs processed with the processing unit 100, that is an Operational tree corresponding to an Operational Flow and the Objects constituting the nodes of the Operational tree (necessary methods inclusive).

The processing unit 100 extracts a method in the parts storage unit 108, adds necessary data and methods to it, creates a tree structure corresponding to the Operational Flow, and edits and stores the tree structure in the program storage unit 106. The processing unit 100 also extracts a program in the program storage unit 106 and modifies it.

The processing unit 100 comprises a flow browser 110, flow editor 120, action editor 130, and tracer 140.

The flow browser 110 displays the hierarchical structure (tree structure) on the display unit 102. Using a zoom-in or zoom-out Operation enables the whole structure and, if required, details to be displayed. For example, on double clicks of a Composite Operation with the mouse, a Child Operation of the Operation may be arranged to be displayed. For example, such a display as shown in FIG. 5 is performed.

The flow editor 120 enables the creation of a tree structure corresponding to an Operational Flow, the delete or move of a defined Operational Object, and the creation and addition of a new Operational Object to a defined position. It enables it to perform an operation, for example, changing from FIG. 5 and FIG. 8.

The action editor 130 is for the purpose of inputting information required for the execution of a program. That is, even in using an Operation Object, since there is processing peculiar to individual Operations, the action editor 130 is for the purpose of enabling processing to specify the corresponding data and methods. That is, it comes to define a class of the utmost derived Object.

With Loop Composite Operations, an initialAction method is defined. In FIG. 3, a reset action must be performed to specify an action to set the data to be handled in a Loop Composite Operation at 0. Furthermore, concerning action to be performed for every repetition, an eachRepeat method is defined. In FIG. 3, the data Loop is incremented by +1. Furthermore, a finalAction method is also defined. In FIG. 3, however, there is no need specify it. Thus, when no action is required, it may not be defined.

With Sequence Composition Operations, an initialAction method, finalAction method, and data are defined. In FIG. 3, however, they are not defined because they are not necessary.

The case of Selection Composition Operations is also the same as that of Sequence Composition Operations. With Objects to handle data, there is need to specify a responder method.

With Primitive Operations, in performing the processing of an Event, the Event must be defined and, further, a handleEvent method must be defined. In such a case as to modify data, to find an Object that holds the data, this handleEvent must be so arranged as to issue a responder message.

In this way, by defining the derived class and combining it with methods belonging to each class of the Objects that have already been stored, an Operation Object is formed.

On a simulator during the execution of a reactive system, the tracer 140 performs a highlighted display of the current Operation Object and a display of internal data. Also, the tracer 140 may have a break function to break in a defined Operation Object. The role of this simulator may be assumed in the processing unit 100 and may be fulfilled by using the one connected to the input/output unit 104.

This system may extract Objects forming individual parts with the flow editor 120 to create such a tree structure as shown in FIG. 5 or FIG. 8 or may display the Objects of an appropriate class with the flow browser 110 to specify the data and methods required in the action editor 130.

One example of defining methods for every hierarchical class is shown in the modeling of Objects, but is not limited to this. If there is a necessary Object in the system, it may be defined, or some Objects may not be defined if unnecessary.

Advantages of the Invention

There are advantages in that the use of these tools permits good points of object-oriented programming to be effectively utilized and further facilitates programming.

Due to visualization of a program, the construction, modification, and other editions of a program becomes easier to produce.

Furthermore, the object-orientation elevates the use of a component format; and, in effective customization, assembly, modification, and other processing of these component parts, the presence of tools is advantageous as with machines or other equipment. As for the constitution of these tools, the inevitable consideration of the nature of programs that these tools are effective only on computers and their use is effective from the standpoint of ease in assembly, customization, copy, delete, and the like, ensures the present program creation apparatus invented on the basis of technical properties of program parts, subjects of the present invention, to bring about greater advantages than that of simple computer use.

Another embodiment of the present invention is a stored program implementing the method embodied as an article of manufacture by embedding the stored program onto diskette, or other portable storage media. This embodiment is in addition to the embodiment of the present invention as a stored program embodied as a special purpose apparatus by storing the program's executable instructions in memory for execution by a computer.

Of course, many modifications and adaptations to the present invention could be made to advantage without departing from the spirit of this invention. Further some features of the present invention could be used without corresponding use of other features. Accordingly, this description should be considered as merely illustrative of the principles of the present invention and not in limitation thereof.

What is claimed is:

1. A program creation apparatus for reactive systems comprising:

(a) a parts storage unit for storing methods defining actions common to operations, methods defining actions common to composite operations, methods defining actions peculiar to loop composite operations, methods defining actions peculiar to sequence composite operations, methods defining actions peculiar to selection composite operations, and methods defining actions peculiar to primitive operations;

(b) display means;

(c) input means;

(d) flow editor means for creating and modifying a tree structure corresponding to an operational flow of a program by a combination of objects of said loop composite operations, objects of said sequence composite operations, objects of said selection composite operation, and objects of said primitive operation in response to a signal from said input means;

(e) flow browser means for allowing said display means to display said tree structure in any hierarchical class in response to a signal from said input means; and (f) action editor means for enabling a user to input methods defining an action peculiar to each operation and data to be handled by the operation and for extracting and combining the methods needed for the operation from said parts storage unit, wherein each of said methods controls said operational flow and data processing through mutual issuance of messages for communications.

2. A program creation apparatus for reactive systems as claimed in claim 1, wherein said methods defining actions common to operations include a responder method that transfers a responder message for searching for an operation to handle data to a parent operation, and said methods defining actions common to composite operations include a start method that issues an initialAction message, controlChildren message, and finalAction message in response to a start message from a parent operation and a canContinue method that transfers a canContinue message for requesting a parent operation to inquire whether an operation to be executed after a current operation is executable.

3. A program creation apparatus for reactive systems as claimed in claim 2, wherein said methods peculiar to loop composite operations include:

a controlChildren method that issues a canstart message inquiring whether a child operation is executable or not in response to a controlChildren message and, if executable, issues a start message, or if the child operation does not perform whatever action, issues a canContinue message to a current operation itself; and a canStart method that issues a canStart message for inquiring whether a child operation is executable or not in response to a canStart message from a parent operation.

4. A program creation apparatus for reactive systems as claimed in claim 2, wherein said methods peculiar to sequence composite operations include:

a controlChildren method that issues a start message to child operations in sequence in response to a controlChildren message;

a canStart method that issues a canStart message for inquiring whether a child operation is executable or not in response to a canStart message from a parent operation; and a second canContinue method that inquires whether an operation to be executed after the current operation is executable.

5. A program creation apparatus for reactive systems as claimed in claim 2, wherein said methods peculiar to selection composite operations include: a controlChildren method that issues a canStart message for inquiring whether a child operation is executable or not in response to a controlChildren message and, if executable, issues a start message or, if the child operation does not perform whatever action, issues a canContinue message to a current operation itself; and a canStart method that issues a canStart message for inquiring whether a child operation is executable or not in response to a canStart message from a parent operation.

6. A program creation apparatus for reactive systems as claimed in claim 1, wherein said methods defining actions common to operations include a responder method that transfers a responder message for searching for an operation to handle data to a parent operation and said methods defining actions peculiar to primitive operations include a start method that issues a handleEvent message for calling a handleEvent method that handles an Event as a primitive operation in response to a start message from a parent operation and a canStart method that returns a decision on whether an input event is executable or not from a comparison with the expected event to a parent operation.

7. A program creation apparatus for reactive systems as claimed in claim 2, wherein, when said action editor means, for the purpose of an input concerning loop composite operations, prompts inputs methods defining an initial action for an initialAction message, a final action for a final action message, actions to be performed for each repetition, and, if there is data to be handled in loop composite operation, the relevant data and a responder method that performs management of the data.

8. A program creation apparatus for reactive systems as claimed in claim 2, wherein, when said action editor means, for the purpose of input concerning said sequence composite operations and said selection composite operations, prompts inputs methods defining an initial action for an initialAction message, a final action for a final action message, and, if there are data to be handled in said sequence composite operations and said selection composite operations, the relevant data and a responder method that performs management of the data.

9. A program creation apparatus for reactive systems as claimed in claim 2, wherein, when said action editor means, for the purpose of an input concerning said Primitive Operations, prompts inputs an event to be handled and the methods defining actions for the event.

10. A program creation apparatus for reactive systems as claimed in claim 1, further comprising:

program storage means for storing program created, including a tree structure corresponding to the operational flow and the operation objects corresponding to the nodes of the tree structure;

wherein the flow browser means can extracts an existing program from the program storage means and display it on the display device, and the flow editor means can instruct the modification of an existing program.

11. A program creation apparatus for reactive systems as claimed in claim 1, further comprising:

means for simulating a reactive system to execute a program created; and tracer means for displaying which section of the program created is being executed on the display device.

* * * * *